United States Patent Office 3,517,493
Patented June 30, 1970

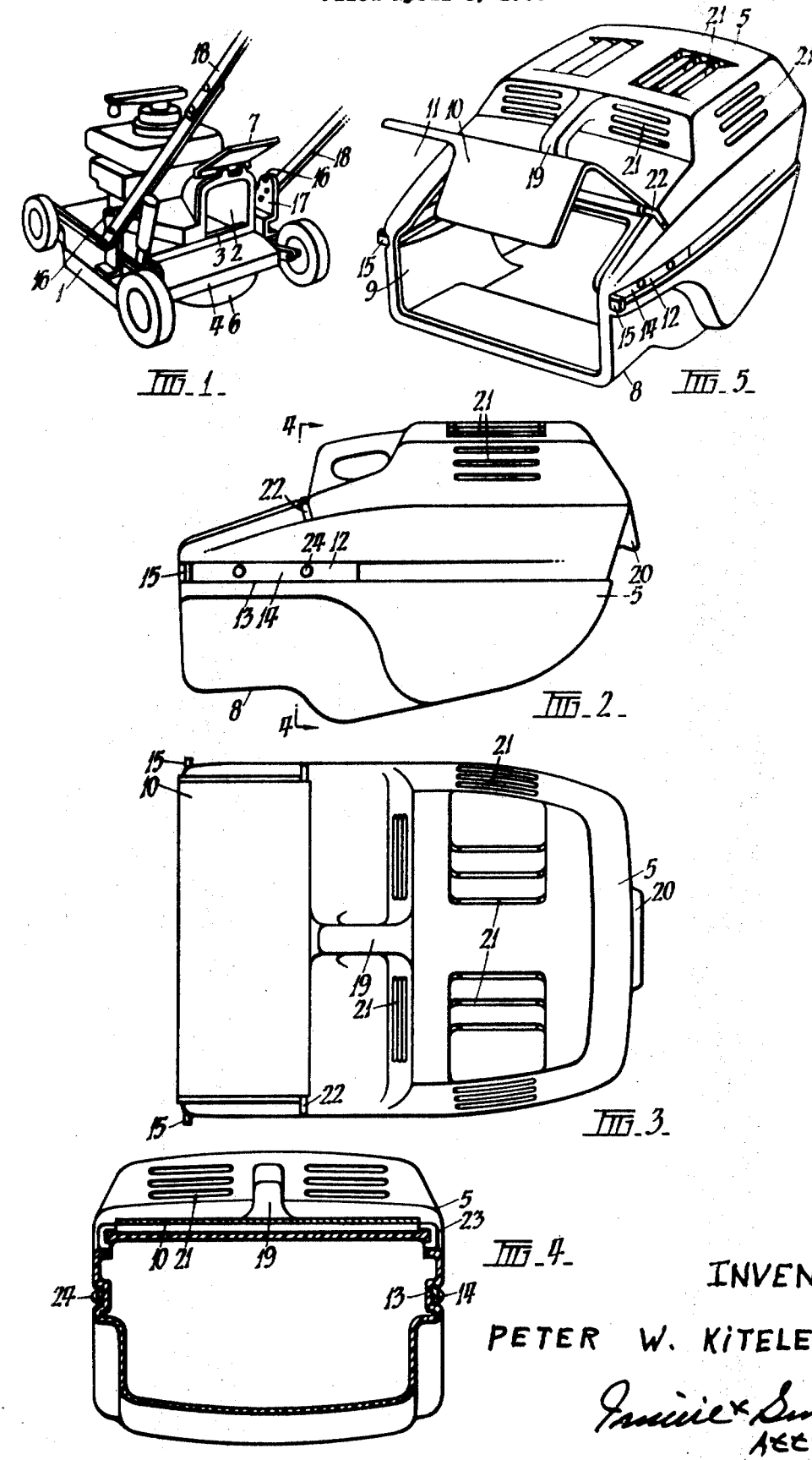

3,517,493
LAWNMOWER AND GRASS CATCHER THEREFOR
Peter W. Kiteley, Nunawading, Victoria, Australia, assignor to Turner Industries Limited, Nunawading, Victoria, Australia, a corporation of Australia
Filed Apr. 8, 1968, Ser. No. 719,340
Int. Cl. A01d 53/06
U.S. Cl. 56—194                                               6 Claims

ABSTRACT OF THE DISCLOSURE

A lawn mower has a rear outlet aperture disposed in a generally vertical plane and a base including a generally horizontal shelf. A removeable grass catcher comprises a plastic molded body supported on said shelf and secured in operative position by mounting brackets mounted on opposite sides thereof. The grass catcher has an open front disposed in a generally vertical plane and a flap is swingably supported by the body, the flap having a cutaway portion registering with the outlet aperture so as to close off the open front of the grass catcher except in the area adjacent the outlet aperture. This flap automatically swings open when the grass catcher is removed from the lawn mower to allow grass cuttings to fall out through the open front of the grass catcher.

---

This invention relates to an improved lawn mower of the horizontal rotating blade type and a grass catcher therefor.

The object of the invention is to provide a lawn mower of this type especially designed or constructed to receive a grass catcher as part of a complete integrated assembly, and also a particular construction of grass catcher for the purpose, the grass catcher preferably being made as a plastic moulding.

To achieve the above object, there is provided, according to the invention, a lawn mower of the above type characterized by having a base provided with a helical upswept passageway through which the cut grass is swept to a rear outlet aperture arranged at the upper end of the passageway, and a horizontal shelf on the base arranged below the outlet aperture and extending rearwardly therefrom to support a grass catcher into which the cut grass is swept through the outlet aperture.

The invention is more fully described and ascertained aided by reference to the accompanying drawings which illustrate the preferred embodiment. In these views:

FIG. 1 is a perspective view showing the rear portion of the mower, the grass catcher being removed.
FIG. 2 is a side view of the grass catcher.
FIG. 3 is a plan view of FIG. 2.
FIG. 4 is a section on line 4—4 of FIG. 2.
FIG. 5 is a perspective view of the grass catcher viewed from the front.

As is shown in these views, the mower has a base 1, preferably in the form of an aluminum casting, provided with a helical upswept passageway 2 through which the cut grass is swept to a rear outlet aperture 3 arranged at one side of the rear of the base at the upper end of the passageway. The base also has a horizontal shelf 4 arranged below the outlet aperture 3 and extending rearwardly therefrom to support the forward end of the grass catcher 5.

The horizontal shelf 4, in addition to supporting the forward end of the grass catcher, also covers the rear portion of the area of the rotating blades of the mower and, on its underside, it has a downwardly projecting guard 6 preferably of curved shape cast integrally with the base. Such guard gives protection for the feet of the user from the rotating blades when the grass catcher is removed.

A safety flap 7 is hinged to the base above the outlet aperture 3 from the helical upswept passageway 2 and is adapted to drop by gravity over said aperture when the grass catcher is removed to prevent cut grass being blown or discharged from said aperture while the grass catcher is detached.

The grass catcher 5 is preferably made as a plastic moulding. Blow moulding is very suitable. The catcher is constructed with a forwardly extending shaped portion 8 to rest upon the horizontal shelf 4 of the mower base and such forwardly extending portion has an open front as 9. Hinged or pivoted to the grass catcher above said open front is a flap 10 having, at one side, a gap or cutaway portion 11 corresponding to the aperture 3 of the helical upswept passageway. Thus, the forward end of the grass catcher is closed by such flap 10 except at the portion corresponding to said aperture through which the cut grass is blown or discharged into the grass catcher.

In addition to being supported on the horizontal shelf 4 of the mower base, the grass catcher is also preferably connected to the base by two brackets 12 arranged one on each side of the grass catcher. Preferably, the grass catcher is moulded with a horizontal channel or recess 13 in each side to receive a metal bracket 14 which may be secured to the grass catcher by bolts, rivets or other means. The outer end of each bracket preferably has a laterally bent extremity 15 which is detachably engaged in a slot 16 or the equivalent on the base of the mower. In the preferred construction, the base has upwardly extending brackets 17 secured to it to support the handle 18 of the mower and said brackets have the slots 16 in their upper ends to detachably receive the laterally bent extremities 15 in the grass catcher brackets.

In use, the hinged or pivoted flap 7 on the base is raised and the grass catcher attached by being supported on the horizontal shelf 4 with the bent extremities 15 of the grass catcher brackets 14 engaged in the co-acting slots 16 on the mower. The cut grass is swept up the helical passageway through the aperture 3 into the catcher.

When the grass catcher is full, it is removed after first disengaging the bent extremities 15 of the catcher brackets 14 from the co-acting slots 16 and the grass catcher up ended to empty it. In this action, the hinged or pivoted flap 10 at the front portion of the grass catcher automatically swings open, allowing the grass cuttings to fall out without obstruction.

The grass catcher is preferably provided on its upper central portion with a handle as 19 to facilitate handling and emptying of the catcher. Preferably said handle is integrally moulded. There may also be a moulded-on finger grip 20 at the rear of the grass catcher for convenience in handling.

The catcher may also have suitably spaced air vents or slots 21, there preferably being two series of slot-like vents in a front sloped portion of the top of the catcher facing towards the front and any desired number of series of slot-like vents in the top portion of the catcher. Some of said slots may be of louvre-like form.

The hinge or pivot for the flap 10 on the grass catcher may consist of a groove 22 moulded in the top surface of the catcher close to the open forward end to support a suitable hinge member as 23 and the channels receiving the brackets on the grass catcher may have locating pips 24 or the like to fit into holes in the brackets.

I claim:
1. In combination, a lawn mower including a base having a passageway through which cut grass is swept and which terminates in a rear outlet aperture disposed in a generally vertical plane, said base including a generally horizontal shelf disposed below said outlet aperture and extending rearwardly thereof, a removeable grass catcher comprising a plastic molded body including a forwardly extending shaped portion the lower part of which is supported on said shelf, said body having an open front disposed in a generally vertical plane and a part of said open front being aligned with and adjacent said outlet aperture, a flap swingably supported by said body, said flap having a cut-away portion registering with said outlet aperture so as to close off said open front except the area adjacent said outlet aperture through which grass cuttings are discharged into the grass catcher, said flap automatically swinging open to allow grass cuttings to fall out through the open front of the grass catcher when it is removed from the lawn mower and up-ended, said grass catcher having mounting brackets mounted on opposite sides thereof above said lower part of said forwardly extending shaped portion, and means on said base engageable with said brackets for supporting the grass catcher in operative position.

2. Apparatus as defined in claim 1, wherein said mounting brackets have laterally bent extremities, said base having means thereon including slots for receiving said laterally bent extremities.

3. Apparatus as defined in claim 2, including upwardly extending brackets secured to said base, a handle for said lawn mower supported by said upwardly extending brackets, said upwardly extending brackets having said slots formed in their upper ends.

4. Apparatus as defined in claim 1, wherein said grass catcher is provided with a handle on it supper central portion to facilitate handling and emptying of the grass catcher.

5. Apparatus as defined in claim 1, wherein said grass catcher has a finger grip formed on the rear portion thereof for convenience in handling.

6. Apparatus as defined in claim 1, wherein said flap is swingably supported by a hinge member, said grass catcher having a groove molded in the top surface thereof for receiving said hinge member.

References Cited

UNITED STATES PATENTS

| | | | |
|---|---|---|---|
| 2,361,637 | 10/1944 | Lathrop | 56—199 |
| 2,882,668 | 4/1959 | Murillo | 56—202 XR |
| 2,882,670 | 4/1959 | Stephens | 56—194 |
| 2,887,839 | 5/1959 | Pommer | 56—202 |
| 2,955,402 | 10/1960 | Strasel | 56—202 XR |
| 3,110,147 | 11/1963 | Barth | 56—199 |
| 3,134,214 | 5/1964 | Shaw | 56—202 |
| 3,191,370 | 6/1965 | Epstein | 56—202 |
| 3,192,692 | 7/1965 | Slemmons | 56—202 XR |
| 3,199,277 | 8/1965 | Moody | 56—202 XR |
| 3,402,535 | 9/1968 | Nelson | 56—25.4 |

FOREIGN PATENTS

| | | |
|---|---|---|
| 256,652 | 5/1963 | Australia. |
| 282,007 | 3/1966 | Australia. |

LOUIS G. MANCENE, Primary Examiner

J. A. OLIFF, Assistant Examiner

U.S. Cl. X.R.

56—202